3,043,811
DYEABILITY OF ACRYLONITRILE POLYMERS

Teddy G. Traylor and Ardy Armen, Concord, Calif., assignors to The Dow Chemical Company, Midland, Mich., a corporation of Delaware
No Drawing. Filed June 20, 1957, Ser. No. 667,026
8 Claims. (Cl. 260—79.3)

Ethylenically unsaturated monomers having sulfonic acid substituents have been copolymerized with acrylonitrile to provide acrylonitrile polymer compositions, especially for fiber-forming purposes, having enhanced dye-receptivity over polyacrylonitrile. Copolymeric compositions of this nature, however, generally have a common and quite unattractive deficiency. They tend to reduce the physical properties of articles formed therewith as compared to similar articles fabricated from the homopolymer and other copolymers of acrylonitrile.

The chief aim and major concern of the present invention is to improve the dye-receptivity of acrylonitrile polymer compositions, particularly fiber-forming compositions and especially polyacrylonitrile, with ethylenically unsaturated monomers having sulfonic acid substituents by means other than copolymerization and without depriving articles desired to be formed with such compositions of the desirable physical properties of the unmodified acrylonitrile polymer.

To this end, dye-receptive sulfonic acid groups may be introduced into an acrylonitrile polymer, particularly polyacrylonitrile, by a method which, surprisingly and simply enough, comprises impregnating or subjecting the polymer to intimate physical contact in a polar, preferably aqueous, medium, with an ethylenically unsaturated sulfonic acid monomer or compound of the general formula: $HO_3S$—G—$CH=CH_2$, wherein G is any bivalent bridging radical containing from 1 to 12 carbon atoms and, advantageously, subsequently heating the monomer in contact with the polymer until at least a portion of it attaches chemically to the polymer chain. In some cases it may be an advantage for G to be a bivalent aromatic group, such as one that has been derived from a benzene or alkyl-substituted benzene nucleus. In certain instances it may also be desirable, or even slightly preferable, for the monomer that is employed to be capable of yielding a tertiary or benzyl-type carbonium ion on protonation. As is apparent, it is also suitable for G to be an alkylene radical or polymethylene group.

The method of the invention may be practiced with the polymer in any fabricated or unfabricated form while it is in either a dried, swollen or hydrated condition. Advantageously, it may be accomplished while the polymer, such as polyacrylonitrile, is in a hydrated, water-containing, aquagel condition, particularly when the polymer in such form has been fabricated into a filamentary structure, prior to its being converted to a dry, hydrophobic polymer substance. As is well known, aquagel structures can be obtained readily by extruding coagulable, fiber-forming solutions of the polymer in solvent, aqueous saline solutions (such as 60 percent aqueous zinc chloride solutions) in suitable aqueous coagulating baths therefor.

Since the dye-receptive sulfonic acid containing groups are attached to the already constituted polymer structure, especially when the method is practiced with shaped articles thereof, there is no undesirable effect on or diminishment of physical properties in articles prepared from the treated polymer. Actually, and with great advantage, the present invention may be practiced with such articles as highly oriented fibers, for example, since the dye receptive sulfonic acid groups may be readily introduced into existent amorphous areas of the already highly crystalline fibers. This, as is apparent, provides the significant benefit of permitting the dye receptive constituent to be concentrated in the amorphous areas of the oriented fiber while permitting a fiber to be prepared whose crystallinity and crystal sizes are not appreciably different from that which may be achieved in a fiber that consists of substantially unmodified homopolymer. As a consequence, better physical properties may be more readily attained (or maintained) in a fiber product than may be realized when conventional copolymerizing methods are utilized for the preparation of dye-receptive polymers.

The sulfonic acid monomer may be applied in dilute aqueous (or a polar, low molecular weight aliphatic alcohol) solution as, for example, one containing less than about 20 percent by weight of the dissolved monomer. It is desirable to impregnate the polymer, especially when the polymer is polyacrylonitrile or a copolymer of acrylonitrile containing at least 80 percent by weight of acrylonitrile polymerized in the polymer molecule, with between about 1 and 20 percent, more advantageously between about 1 and 10 percent by weight of the sulfonic acid monomer based on the weight of the polymer. This may be done prior to or simultaneous with the heating of the monomer-impregnated polymer. It is usually satisfactory to heat the impregnated polymer at a temperature of at least 100° C. for about 15 minutes after evaporating the solvent in order to chemically attach the dye-receptive monomer thereto. Frequently, a temperature of 150° C. for at least 5 minutes may be more desirable. When aquagel polymers are being treated the heating may conveniently be accomplished during the drying of the polymer from the aquagel structure to convert it to a hydrophobic form. When filamentary articles are involved, the heat setting that is often employed subsequent to drying may also benefit the attachment.

Acrylonitrile polymers treated according to the method of the invention have a remarkably improved dyeability, especially with basic, acetate and vat types of dyestuffs. This, of course, is due to the presence of the attached sulfonic acid monomer which, when properly combined, is permanently substantive to the polymer. Hence, truly washfast and colorfast dye receptive polymers are provided. The substantivity and chemical attachment of the sulfonic acid monomer results from a reaction which occurs between the polymer and monomer. For demonstrative purposes, this may be typified by the following equation illustrated with vinyl benzene sulfonic acid:

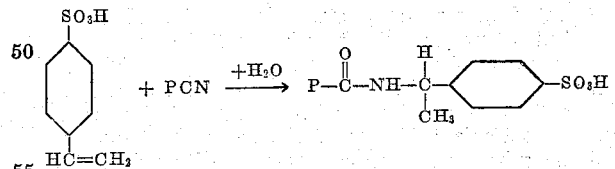

wherein P is the acrylonitrile polymer chain. Although it is to be understood that the invention is not to be limited thereto, the illustrated reaction is deemed to be facilitated by the self-serving agency of the vinyl aromatic sulfonic acid monomer which can be considered to contain both a strong acid (so as to be imaginable as a compound of the type $R^-H^+$) and a group capable of carbonium ion formation, which ions are capable of adding to cyano substituents to give substituted amides. This beneficial dual function of a vinyl aromatic sulfonic acid monomer is represented in the following way with a single molecule of vinyl benzene sulfonic acid:

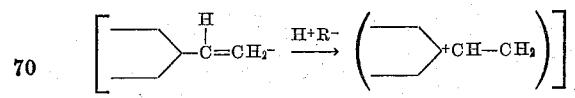

The following examples further illustrate the invention.

Example 1

A sample of wet-stretched, salt-spun polyacrylonitrile fiber in aquagel form (containing about 2 parts by weight of water to each part by weight of polymer in the hydrated structure) was immersed at room temperature for 30 minutes in a 0.35 N aqueous solution of p-vinyl benzene sulfonic acid. The fiber was then squeezed free of liquid, retaining about 7 percent by weight of the monomer, based on the weight of polymer, impregnated therein. The impregnated fiber was dried at 80° C., then heat set at 150° C. for 5 minutes. The finally finished fiber was found to be dyeable to very deep, level shades of coloration with Basic Red 4G and Basic Yellow OL when dyed in a conventional manner with 2 percent dyeings (on the weight of the fiber) of each dyestuff. Severe scouring of the fiber prior to dyeing did not diminish its excellent dye-receptivity. Similar good results were also obtained when the treatment was repeated excepting to dry the fiber completely at a temperature of 150° C. for 15 minutes.

In contrast with the foregoing, the untreated polyacrylonitrile fibers were only faintly stained when it was attempted to dye them in the same way with the same dyestuffs. In further contrast with the foregoing, when the above procedure was employed, excepting to utilize the sodium salt of p-vinyl benzene sulfonic acid (which, incidentally, polymerizes according to conventional procedures with other ethanoid monomers as well as does the free acid form) no increased dyeability was obtained in the treated fiber product. When a solution of the sulfonic acid was evaporated to dryness in an open beaker without any of the fiber being present, no polymeric material was obtained. This stands in sharp contrast to the actual chemical reaction that occurs when the fiber is treated in the above-described manner with the olefinic sulfonic acid.

By way of still further contrast with the foregoing, when wet stretched polyacrylonitrile fibers were treated with a 5 percent by weight aqueous solution of sulfonated polystyrene, and subsequently rinsed and dried, the product that was obtained was dyeable only in its actual peripheral regions. Such ring-dyed sulfonated polystyrene treated fibers were easily distinguishable from the dye-receptive fibers prepared in accordance with the present invention in the above-described manner. The latter were appreciably more dyeable with such dyes as Basic Red 4G and were observed to have become completely penetrated with the dyestuff without experiencing ring-dyeing effects.

Example 2

About 5 grams (on a dry weight basis) of a wet stretched polyacrylonitrile fiber in aquagel form similar to that employed in the first example was treated in the same manner as in the first example with the exceptions that a 2.94 percent by weight aqueous solution of 2-propene sulfonic acid was employed as the monomer and the subsequent heat setting was performed for 15 minutes at the 150° C. temperature. The finally washed fiber was found to be dyeable to good shades of coloration with Basic Red 4G and to exhibit good wash-fastness upon scouring.

Example 3

The procedure of Example 2 was repeated, excepting to impregnate the fiber with about a 2.46 percent by weight aqueous solution of vinylbenzyl sulfonic acid instead of 2-propene sulfonic acid. The finished fiber product was found to be excellently dyeable to deep, level shades of red with Basic Red 4G and to exhibit very good wash-fast characteristics.

What is claimed is:

1. Method for improving the dyeability of fully polymerized acrylonitrile polymers that contain at least about 80 weight percent of polymerized acrylonitrile in the polymer molecule which method comprises subjecting the acrylonitrile polymer, while it is in contact with a polar liquid medium that is chemically inert to the polymer and the subsequently defined monomeric compound, to up to about 20 weight percent, based on polymer weight, of a monomeric compound of the general formula:

$$HO_3S-G-CH=CH_2$$

wherein G is a bivalent hydrocarbon bridging radical containing from 1 to 12 carbon atoms; and heating the monomeric compound in contact with the acrylonitrile polymer at an elevated temperature above room temperature until at least a portion of said monomeric compound attaches chemically as single units on the chain of the polymer by means of substituted amide linkages with the nitrogens in the polymerized acrylonitrile units in the acrylonitrile polymer chain.

2. The method of claim 1 wherein the polymer is in aquagel condition and is subjected in aqueous medium to said monomeric compound.

3. Method for improving the dyeability of polyacrylonitrile which comprises subjecting the polymer, while it is in an aquagel form, to an aqueous solution of a monomeric compound of the general formula:

$$HO_3S-G-CH=CH_2$$

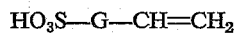

wherein G is a bivalent hydrocarbon bridging radical selected from the group consisting of bivalent aromatic radicals containing from 6 to 12 carbon atoms and alkylene radicals containing from 1 to 12 carbon atoms until between about 1 and 20 percent by weight of said monomeric compound is intimately associated with said polymer, based on the weight of the polymer; then heating the thereby associated polymer and monomeric compound for at least about 5 minutes at a temperature between about 100 and 150° C.

4. The method of claim 3, wherein the aquagel polymer is in filamentary form.

5. The method of claim 3, wherein G is a bivalent aromatic hydrocarbon radical.

6. The method of claim 3, wherein said monomeric compound is vinyl benzene sulfonic acid.

7. The method of claim 3, wherein said monomeric compound is 2-propene sulfonic acid.

8. The method of claim 3, wherein said monomeric compound is vinyl benzyl sulfonic acid.

References Cited in the file of this patent

UNITED STATES PATENTS

| Number | Name | Date |
| --- | --- | --- |
| 2,601,256 | Bruson | June 24, 1952 |
| 2,688,088 | Chaney | Aug. 31, 1954 |
| 2,726,132 | Craig | Dec. 6, 1955 |
| 2,837,500 | Andres et al. | June 3, 1958 |
| 2,837,501 | Millhiser | June 3, 1958 |